106. COMPOSITIONS, COATING OR PLASTIC

Patented May 6, 1924.

1,492,866

UNITED STATES PATENT OFFICE.

NAOKI TAKATA, OF TOKYO, JAPAN.

ACID-PROOF CEMENT LINING FOR DIGESTERS OF SULPHITE PULP.

No Drawing. Application filed February 1, 1922. Serial No. 533,400.

*To all whom it may concern:*

Be it known that I, NAOKI TAKATA, a subject of the Emperor of Japan, and a resident of No. 19 Ohara-Cho, Koishikawa-Ku, city of Tokyo, Empire of Japan, have invented new and useful Improvements in Acid-Proof Cement Linings for Digesters of Sulphite Pulp, of which the following is a specification.

This invention relates to a process of preparation of acid proof, rapid setting cement to be used as a lining of digester of sulphite pulp, and has for its object to obtain cement which can be used a long period without cracking, collapsing, stripping or etching under the action of sulphurous or sulphuric acid even in high pressure and temperature.

According to the present invention the process consists in mixing white clay, lime or calcium carbonate, infusorial earth, asbestos and boric acid or borax thoroughly and the mixture is heated in a furnace, powdered and admixed with lead oxide and the product thus obtained is applied as lining in the state of mud by kneading with sodium silicate solution. An example for carrying out the invention is as follows. The mixture of 60 parts of clay, 10 parts of lime, 3 parts of infusorial earth, 3 parts of asbestos and 6 parts of borax is heated, powdered after cooling and admixed with 10 parts of lead oxide powder.

Alternatively, boric acid or its salt and other materials may be heated and powdered separately and then may be mixed. In general, as silicate has a strong acid resisting property white clay is used as the chief component in the present invention. Lime forms acid proof, insoluble calcium silicate by reacting with soluble silicates and also forms calcium sulphite by the action of acid sulphite solution during the digesting operation and a small part of calcium sulphite thus formed passes to calcium sulphate. These calcium salts are all white, minute, acid proof substances and have the effect of increasing the acid resisting property of mortar. As infusorial earth has a property of increasing the minuteness and water proofing character of mortar, it prevents the penetration of bisulphite solution. Asbestos is a acid proof substance and its fibrous state contributes to the firmness of mortar after setting. Boric acid combines with lead, calcium, etc., and forms a white insoluble, minute substance having a water proof property. Thus, boric acid or borax in mortar forms insoluble salts of lead and calcium, etc., and distributes through the whole mass of mortar after setting. According to the fact, such mortar is very compact in quality and does not allow the penetration of liquid and moreover its resisting power against sulphuric and sulphurous acid is very large. Again, lead oxide forms lead silicate by setting or remains as the original form which though gradually passes to lead sulphate or sulphite by the action of sulphuric or sulphurous acid during the digesting operation, yet these resulting compounds are white, minute substances of acid resisting property and have the effect of preventing the penetration of liquid and also accelerate the time of setting.

Heretofore, the difficulty of bisulphite pulp manufacture may be said to lie in the lining of digester and the difficulty of lining exists solely in cement. Designs heretofore published with respect to such cement have not sufficient effect in practice. Again, as such kind of cement imported from Sweden to Japan requires about 30 seconds for the setting of the degree of supporting the inner lining in arch part, it results in uneven setting and acts to split due to the abrupt change of temperature and pressure by discharging operation. Moreover, as such cement materials are not heated, it collapses and strips gradually by the action of acid liquor, evolving carbonic acid gas and hydrogen sulphide. Again, the coarseness of the quality of siliceous substance in the said cement results in unhard and uncompact lining after setting and permits the penetration of acidic liquor with the result of etching and collapsing when treated under high pressure. The present invention has obviated these difficulties and the characteristics lies in admixing boric acid or borates to the common components of lining cement, followed by heating and powdering. Boric acid or borates, when heated with lime in presence of silica or silicates, forms calcium salts by combining with lime at high temperature and finally passes to very complex substance by combining with silica or silicates. The said complex substances is amorphous in nature and has a strong acid resisting property. Moreover, its small coefficient of expansion is especially beneficial to the use of lining of sulphite digester which suffers abrupt change of temperature. Boric acid or borates forms calcium salt by setting and according to experiments it accelerates the setting of calcium silicate and makes the whole mass very compact and tough. During the digesting operation a small part of borate in the neighborhood of the surface may be dissolved by sulphurous acid, yet the minute particles of calcium sulphite replace it and makes the surface compact and strong, thereby preventing the penetration of liquid. The cement of the present invention is far cheaper than similar acid resisting ones, sets rapidly, forms no cracking and the mass after setting is compact and tough and has a high acid resisting property. Moreover, its small coefficient of expansion allows the use for a long period without fear of cracking or collapsing. Again, the selection of raw materials is easy as heating operation is employed in the present invention for the preparation of cement.

Having now particularly described and ascertained the nature of my said invention and in what manner the same is to be performed, I declare that what I claim is:—

The method of making an acid proof, rapid setting cement ingredient for use in lining a sulphite pulp digester, consisting in mixing substantially 60 parts of white clay, substantially 10 parts of lime, substantially 3 parts of asbestos and substantially 6 parts of borax, heating such mixture, powdering the product after cooling, and admixing the same with substantially 10 parts of lead oxide powder.

In testimony whereof I affix my signature in presence of two witnesses.

NAOKI TAKATA.

Witnesses:
MATSUGORO OTSUKA,
KENJIRO TAKANAKA.